United States Patent
Chen et al.

(10) Patent No.: US 7,889,697 B2
(45) Date of Patent: Feb. 15, 2011

(54) METHOD AND APPARATUS FOR CONTENT DELIVERY TO A MOBILE DEVICE

(75) Inventors: An Mei Chen, San Diego, CA (US); Ben A. Saidi, San Diego, CA (US); Ravinder Chandhok, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 978 days.

(21) Appl. No.: 11/120,741

(22) Filed: May 2, 2005

(65) Prior Publication Data

US 2005/0265345 A1 Dec. 1, 2005

Related U.S. Application Data

(60) Provisional application No. 60/568,326, filed on May 4, 2004.

(51) Int. Cl.
*H04W 4/00* (2009.01)

(52) U.S. Cl. .......... 370/331; 370/252; 455/436

(58) Field of Classification Search .......... 370/252, 370/253, 328, 338, 395.2, 395.21, 465; 455/436, 455/442

See application file for complete search history.

(56) References Cited

U.S. PATENT DOCUMENTS

| | | | | |
|---|---|---|---|---|
| 5,771,467 | A * | 6/1998 | Sato | 455/557 |
| 6,320,898 | B1 * | 11/2001 | Newson et al. | 375/144 |
| 7,006,472 | B1 * | 2/2006 | Immonen et al. | 370/332 |
| 7,054,632 | B2 * | 5/2006 | Attar et al. | 455/436 |
| 7,260,398 | B2 * | 8/2007 | Igarashi et al. | 455/436 |
| 7,277,392 | B2 * | 10/2007 | Venteicher et al. | 370/237 |
| 7,307,532 | B2 * | 12/2007 | Ikeda et al. | 340/572.1 |
| 7,349,432 | B2 * | 3/2008 | Lindgren et al. | 370/468 |
| 2002/0067707 | A1 * | 6/2002 | Morales et al. | 370/331 |
| 2002/0196752 | A1 * | 12/2002 | Attar et al. | 370/331 |
| 2003/0211849 | A1 | 11/2003 | Robinson | |
| 2004/0087304 | A1 * | 5/2004 | Buddhikot et al. | 455/426.2 |

(Continued)

FOREIGN PATENT DOCUMENTS

WO   WO03/055261 A1   7/2003

(Continued)

OTHER PUBLICATIONS

3GPP, Ericsson: "Improved Session Setup and Bandwidth Adapation," 3GPP TSG-SA WG4 Meeting #18; TDOC S4-010477, pp. 1-5, Sep. 2001, retrieved on Sep. 6, 2005.

(Continued)

*Primary Examiner*—Ricky Ngo
*Assistant Examiner*—Kan Yuen
(74) *Attorney, Agent, or Firm*—Sandip "Micky" Minhas; Gerald P. Joyce, III (57) ABSTRACT

Methods and apparatus for content delivery to a mobile device. A method is provided for receiving content in a wireless data network. The method includes initiating a content download over a first connection that supports a first data rate, wherein the content has a selected quality level, and establishing a second connection that supports a second data rate. The method also includes comparing the first data rate to the second data rate, and processing the content download based on the result of said comparing.

8 Claims, 7 Drawing Sheets

U.S. PATENT DOCUMENTS

2004/0114553 A1*  6/2004  Jiang et al. .................. 370/328
2005/0020273 A1*  1/2005  Fong et al. .................. 455/453
2005/0076136 A1   4/2005  Cho et al.
2008/0039091 A1*  2/2008  Eguchi et al. ............... 455/436

FOREIGN PATENT DOCUMENTS

WO       2004002130        12/2003
WO       WO2004/028095 A1  4/2004

OTHER PUBLICATIONS

International Preliminary Examination Report—PCT/US02/015451, IPEA/US—Jan. 31, 2008.
International Search Report—PCT/US05/015451, International Search Authority—European Patent Office—Sep. 19, 2005.
Written Opinion—PCT/US05/015451, International Search Authority—European Patent Office—Sep. 19, 2005.

* cited by examiner

METHOD AND APPARATUS FOR CONTENT DELIVERY TO A MOBILE DEVICE

The present Application for Patent claims priority to Provisional Application No. 60/568,326 entitled "METHOD AND APPARATUS FOR DELIVERING CONTENT TO MOBILE DEVICES WITH BOTH 1XRTT AND 1XEV-DO NETWORK COVERAGE" filed May 4, 2004, and assigned to the assignee hereof and hereby expressly incorporated by reference herein.

BACKGROUND

I. Field

Embodiments of the invention relates generally to content delivery in a data network, and more particularly, to methods and apparatus for content delivery to a mobile device operating in a changing network environment.

II. Description of the Related Art

The distribution of content (data) to a large number of terminals (subscribers) in a wireless network is a complicated problem. For example, wireless networks cover large geographic regions, and the type of network coverage and/or available services may be different for each region. Therefore, delivering content to mobile devices that are moving from region to region requires an efficient delivery system that conserves network resources while providing device users with the content they desire.

Typically, wireless data networks are able to support the transmission of content under one or more communication technologies. For example, many wireless networks are capable of transmitting information using Single Carrier (1×) Radio Transmission Technology (CDMA2000 1×). Using this technology, data and other information may be transmitted over a data network to provide a selected level of service and/or quality. For example, the data transmission rates supported by this technology may be used to deliver text and/or low quality images. Generally, lower transmission rates support lower quality of service (QoS) levels. Increasingly, many wireless networks are being upgraded to operate using Single Carrier (1×) Evolution Data Optimized (CDMA2000 1×EV-DO) technology. Under this technology, transmissions over the network may occur at rates two to three times that of CDMA2000 1×.

As a result of the increased transmission rates, it is possible to deliver content having a higher level of quality. For example, CDMA2000 1× EV-DO networks are able to transmit video content with far greater quality than CDMA2000 1× networks. As a result, CDMA2000 1× EV-DO networks are able to provide the same content with greater resolution and therefore higher quality-of-service than CDMA2000 1× networks.

Due to a variety of circumstances, a wireless network that covers a large geographic region may have portions of the network that operate using either or both technologies. This situation may result in "holes", or discontinuities in the coverage that a particular wireless network provides. For example, a mobile terminal may receive content transmitted using CDMA 2000 1× EV-DO, but then move to another geographic region where the network only supports CDMA 2000 1×. As a result, the terminal may experience coverage holes that may prevent the reception of content having a desired quality level. For instance, the terminal may be in the process of receiving high quality content transmitted using CDMA2000 1× EV-DO, and then after moving into a different geographic region, the terminal is handed-off to a network that operates using CDMA2000 1×. In the new network environment, the terminal may be unable to receive the content with the desired quality level because it would be very inefficient to attempt to transmit high quality content using the slower transmission rate. Thus, conventional systems may be unable to compensate for holes in network cover that may prevent content having a desired quality level from being received at a mobile terminal as it moves through various geographic regions.

Therefore, what is needed is a system that allows content having a desired quality level to be delivered to a mobile device, while the device moves through various geographic regions where the network supports one or more transmission technologies. For example, the system should allow the device to receive the quality of content it desires as the device is handed off between data networks supporting different data transmission technologies. The system should also operate to automatically select content to download to a device, where the selected content has a particular quality level based on an existing network connection with the device.

SUMMARY

In one or more embodiments, a content delivery system, comprising methods and apparatus, is provided that operates to allow a mobile device to efficiently receive content in a data network. In one embodiment, the system employs logic that operates to determine the quality of content the terminal may receive based on the available network connection. The system is especially well suited for use in wireless networks where different geographic regions may operate using different network transmission technologies.

In one embodiment, a method is provided for receiving content in a wireless data network. The method comprises initiating a content download over a first connection that supports a first data rate, wherein the content has a selected quality level, and establishing a second connection that supports a second data rate. The method also comprises comparing the first data rate to the second data rate, and processing the content download based on the result of said comparing.

In one embodiment, apparatus is provided for receiving content in a wireless data network. The apparatus comprises transceiver logic configured to initiate a content download over a first connection that supports a first data rate, wherein the content has a selected quality level, and establish a second connection that supports a second data rate. The apparatus also comprises processing logic configured to compare the first data rate to the second data rate, and process the content download based on the result of said comparing.

In one embodiment, apparatus is provided for receiving content in a wireless data network. The apparatus comprises means for initiating a content download over a first connection that supports a first data rate, wherein the content has a selected quality level, and means for establishing a second connection that supports a second data rate. The apparatus also comprises means for comparing the first data rate to the second data rate, and means for processing the content download based on the result of said comparing.

In one embodiment, a computer-readable media is provided that comprises instructions, which when executed by a processor, operate to receive content in a wireless data network. The computer-readable media comprises instructions for initiating a content download over a first connection that supports a first data rate, wherein the content has a selected quality level, and instructions for establishing a second connection that supports a second data rate. The computer-readable media also comprises instructions for comparing the first data rate to the second data rate, and instructions for processing the content download based on the result of said comparing.

In one embodiment, a method is provided for delivering content in a wireless data network. The method comprises receiving a request for content from a device, and determining a network connection associated with the device. The method also comprises selecting content having a selected quality level, wherein the selected quality level is based on the network connection, and transmitting the content having the selected quality level to the device.

In one embodiment, apparatus is provided for delivering content in a wireless data network. The apparatus comprises processing logic that operates to receive a request for content from a device, determine a network connection associated with the device, and select content having a selected quality level, wherein the selected quality level is based on the network connection. The apparatus also comprises transmitting logic that operates to transmit the content having the selected quality level to the device.

In one embodiment, apparatus is provided for delivering content in a wireless data network. The apparatus comprises means for receiving a request for content from a device, and means for determining a network connection associated with the device. The apparatus also comprises means for selecting content having a selected quality level, wherein the selected quality level is based on the network connection, and means for transmitting the content having the selected quality level to the device.

In one embodiment, a computer-readable media is provided comprising instructions, which when executed by a processor, operate to deliver content in a wireless data network. The computer-readable media comprising instructions for receiving a request for content from a device, and instructions for determining a network connection associated with the device. The computer-readable media also comprising instructions for selecting content having a selected quality level, wherein the selected quality level is based on the network connection, and instructions for transmitting the content having the selected quality level to the device.

Other aspects, of embodiments will become apparent after review of the hereinafter set forth Brief Description of the Drawings, Detailed Description, and the claims.

BRIEF DESCRIPTION OF THE DRAWINGS

The foregoing aspects of the embodiments described herein will become more readily apparent by reference to the following detailed description when taken in conjunction with the accompanying drawings wherein.

DETAILED DESCRIPTION

The following detailed description describes one or more embodiments of a content delivery system that operates to allow a mobile device to efficiently receive content in a data network. The system is especially well suited for use in wireless networks environments, but may be used in any type of network environment, including but not limited to, communication networks, public networks, such as the Internet, private networks, such as virtual private networks (VPN), local area networks, wide area networks, long haul network, or any other type of data network.

Figure 1:
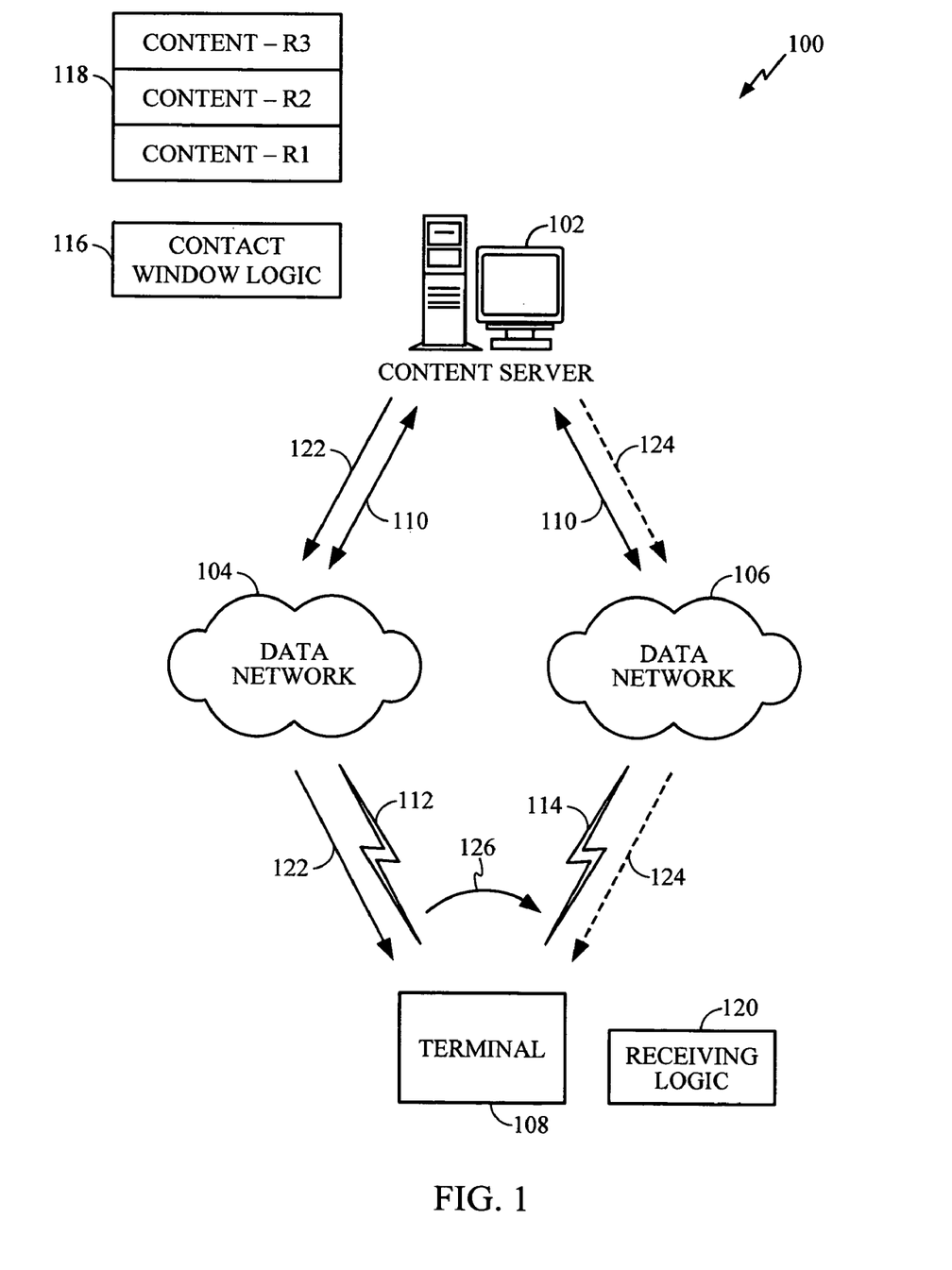
FIG. 1 shows a data network that comprises one embodiment of a content delivery system.

FIG. 1 shows a data network 100 that comprises one embodiment of a content delivery system. The network 100 comprises a content server 102, a data network 104, a data network 106, and a mobile terminal 108. The data networks 104, 106 may be any type and/or combination of wired and/or wireless networks that allow data to be transmitted between the server 102 and the terminal 106. The server 102 communicates with the networks 104, 106 via communication links 110. The communication links 110 may be any type of wired or wireless communication links that allows the server 102 to communicate with the data networks 104, 106.

The server 102 comprises contact window logic 116 and rate-encoded content 118. The contact window logic 116 provides a contact window that defines when the content 118 will be available for reception from the data networks 104, 106. For example, the server 102 makes the content 118 available for download during a time interval defined by the contact window.

The rate-encoded content 118 comprises the content encoded at one or more rates to provide one or more quality levels. For example, the content 118 comprises content formatted at three encoding rates (R1, R2, and R3). The rate at which the content is encoded determines a quality level with which the content is provided. For example, the rate may determine the resolution at which the content may be rendered. For example, the highest level of quality is provided by the content encoded at rate "R1", and the lowest level of quality is provided by the content encoded at rate "R3."

In one embodiment, the data network 104 comprises a high-speed data network that is capable of efficiently transmitting content at a very high data rate. For example, in one embodiment, the data network 104 is capable of supporting data transmission using CDMA2000 1× EV-DO. As a result, all the rate-encoded content 118 (R1, R2, R3) at the server 102 may be efficiently transmitted on the data network 104 to the device 108 to provide various levels of service and/or quality.

In one embodiment, the data network 106 comprises a low-speed data network that is capable of efficiently transmitting content at relatively low data rates as compared to the network 104. For example, in one embodiment, the data network 106 is capable of supporting data transmission using CDMA2000 1×. As a result, only a portion of the rate-encoded content 118 (i.e., content encoded at R2 and R3) at the server 102 may be efficiently transmitted on the data network 104 to the device 108. An attempt to transmit the content 118 encoded at R1 may result in degraded network performance since the network 106 is not capable of transmitting data at a high enough rate to support the transmission of R1 encoded content.

The data networks 104, 106 communicate with the terminal 108 via wireless communication links 112, 114, respectively. Depending on its geographic location, the terminal 108 may be in communication with either of the data networks 104, 106. For example, the terminal 108 may be in communication with the network 104 and then undergo a hand-off 126 process that places the terminal 108 in communication with the network 106. The hand-off process may occur when the terminal 108 moves from one geographic location to another, or if network capacity or prioritization considerations cause certain terminals to benefit from a higher data rate, and other terminals may operate in lower data rate environment. In one or more embodiments, the delivery system allows the terminal to automatically process hand-off conditions so that content from the server 102 may continue to be received at the terminal 108 after the hand-off occurs.

In one embodiment, the wireless communication links 112, 114 comprise forward communication channels, reverse communication channels, control channels, and/or any other type of communication channel that may be used to communicate information between the networks 104, 106 and the terminal 108. For example, the communication link 112 supports data transmission from the data network 104 to the terminal 108 using CDMA 2000 1× EV-DO. The communication link 114 supports data transmission from the data network 106 to the terminal 108 using CDMA 2000 1×.

The terminal 108 comprises any type of mobile device or terminal, such as, a mobile telephone, portable computer, personal digital assistant (PDA), or any other type of portable device capable of receiving data over a wireless communication link. In one embodiment, the terminal 108 comprises receiving logic 120 that operates to allow the terminal to receive content, data, and/or any other type of information from either the data network 104 or the data network 106.

During operation, the content delivery system operates to automatically determine how and what content is transmitted over the two networks involved in a hand-off process. For example, the terminal 108 may be in communication with the network 104 and request to receive high quality content from the server 102. If the request occurs within a selected contact window, the server 108 begins downloading a high quality version of the content to the terminal 108 via the data network 104, as shown by path 122. For example, the content encoded at rate "R1" is downloaded to the terminal 108 at a data rate supported using CDMA2000 1× EV-DO.

During the download process, the terminal 108 undergoes a handoff 126 to the data network 106. For example, the terminal 108 may be in a moving vehicle that has moved within a geographic region covered by the data network 106. Alternatively, there may exist a "hole" in the coverage provided by the network 104 in which the terminal 108 is handed-off to the network 106. As a result, the terminal 108 is handed-off and is now in communication with the network 106 via the link 114. In one embodiment, the receiving logic 120 operates to identify the new network connection and determine the available download rates that are supported by the network 106. If the new network (network 106) supports the download of the content at the same rate, the receiving logic 120 operates to continue the download of the content, as shown by path 124. If the new network (network 106) does not support the same download rate, then the receiving logic 120 operates to perform one or more of the following functions:

1. Wait for a high rate connection to become available again to continue the download.
2. Cancel the current download and request the same content at a quality level that is supported by the new network connection.

It should be noted that various hand-off situations may occur and that operation of the various embodiments in these situations are described more fully in other sections of this description. However, in one or more embodiments, the content delivery system operates to determine the capabilities of the data networks involved in a hand-off process and automatically determine how and what content will be delivered to the terminal 108 after the hand-off occurs.

In another embodiment, the terminal 108 operates to report to the content server 102 when a handoff occurs and what the current transmission capacity is of the new network connection. In response, the content server 102 operates to determine what content to download to the terminal 108 based on the newly available connection. Thus, the content server 102 operates to automatically deliver content having a desired quality level to the terminal 108.

Figure 2:
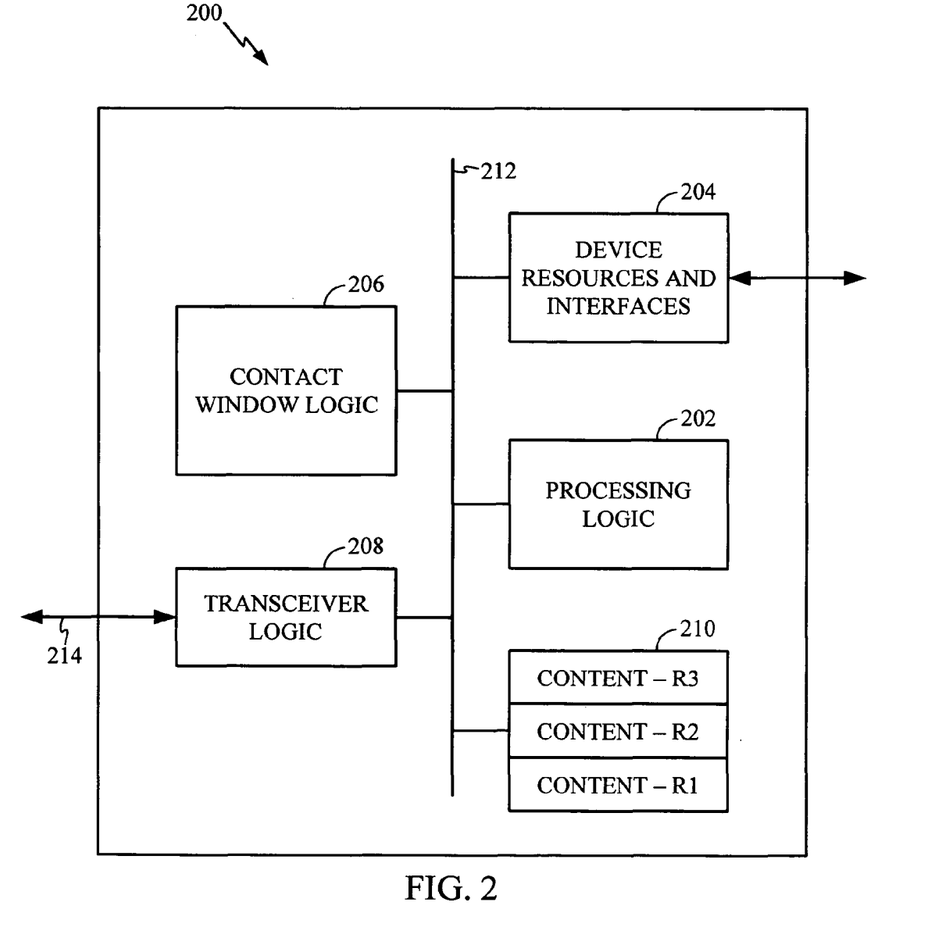
FIG. 2 shows a detailed diagram of one embodiment of a server suitable for use in one embodiment of a content delivery system.

FIG. 2 shows a detailed diagram of one embodiment of a server 200 suitable for use in one embodiment of a content delivery system. For example, the server 200 may be used as the content server 102 in FIG. 1. The server 200 comprises processing logic 202, device resources 204, contact window logic 206, transceiver logic 210, and content 210 encoded at various rates, all coupled to an internal data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions, and to control one or more other functional elements of the server 200 via the internal data bus 212.

The device resources and interfaces 204 comprise hardware and/or software that allow the server 200 to communicate with internal and external systems. For example, internal systems may include mass storage systems, memory, display driver, modem, or other internal device resources. The external systems may include user interface devices, printers, disk drives, or other local devices or systems.

The contact window logic 206 comprises any type of hardware and/or software that allow the server 200 to provide a contact window that determines when the content 210 is available for downloading. For example, the window may be based on periodic time intervals, a licensed time period, network conditions, and/or any other type of criteria that may be used to determine the size and timing of a contact window.

The transceiver logic 208 comprises hardware and/or software that operate to allow the server 200 to transmit and receive data and/or other information with remote devices, systems or networks via communication channel 218. For example, in one embodiment, the communication channel 218 comprises forward, reverse and control channels that are used to communicate with a wireless communication network. In one embodiment, the transceiver logic 208 comprises logic to establish communication channels with one or more data networks that are operating using one or more transmission technologies. For example, the transceiver logic 208 operates to establish a communication channel with data networks using CDMA2000 1× EV-DO, CDMA2000 1×, and/or other transmission technologies.

The rate-encoded content 210 comprises content that is rate encoded at one or more rates to provide one or more levels of quality. For example, the content 210 is encoded so that when it is rendered on a device, a selected level of quality is provided. For example, in one embodiment, the quality provided is based on the resolution with which the content may be rendered on the receiving device. In another embodiment, the content is rate-encoded in multiple levels (R1, R2, R3) based on the network transmission capacity, such that content encoded at a particular rate can be transmitted to provide a selected quality level without degrading network operation.

During operation of the server 200, the transceiver logic 208 receives requests for content from remote devices through the communication channel 214. The requests are processed by the processing logic 202. The contact window logic 206 determines if a window is open for the requested content. If a window is open, the processing logic 202 operates to retrieve the requested rate encoded content 210, and deliver it to the requesting device via the transceiver logic 208.

In one embodiment, the server 200 operates to automatically determine the content to transmit based on the capacity of the network connection of the requesting device. For example, in one embodiment, the request includes information about the type of connection between the network and the requesting device. For example, as the device moves from a high data rate network connection (i.e., CDMA2000 1× EV-DO) to a low data rate network connection (i.e., CDMA2000 1×), the server 200 operates to select and delivery content that can be most efficiently handled by the connection.

In one embodiment, the content delivery system comprises program instructions stored on a computer-readable media, which when executed by the processing logic 202, provides the functions of the server 200 described herein. For example, instructions may be loaded into the server 200 from a computer-readable media, such as a floppy disk, CDROM, memory card, FLASH memory device, RAM, ROM, or any other type of memory device or computer-readable media that interfaces to the server 200 via the device resources 204. In another embodiment, the instructions may be downloaded into the server 200 from a network resource that interfaces to the sever 200 via the transceiver logic 208. The instructions, when executed by the processing logic 202, provide one or more embodiments of a content delivery system as described herein.

Figure 3:
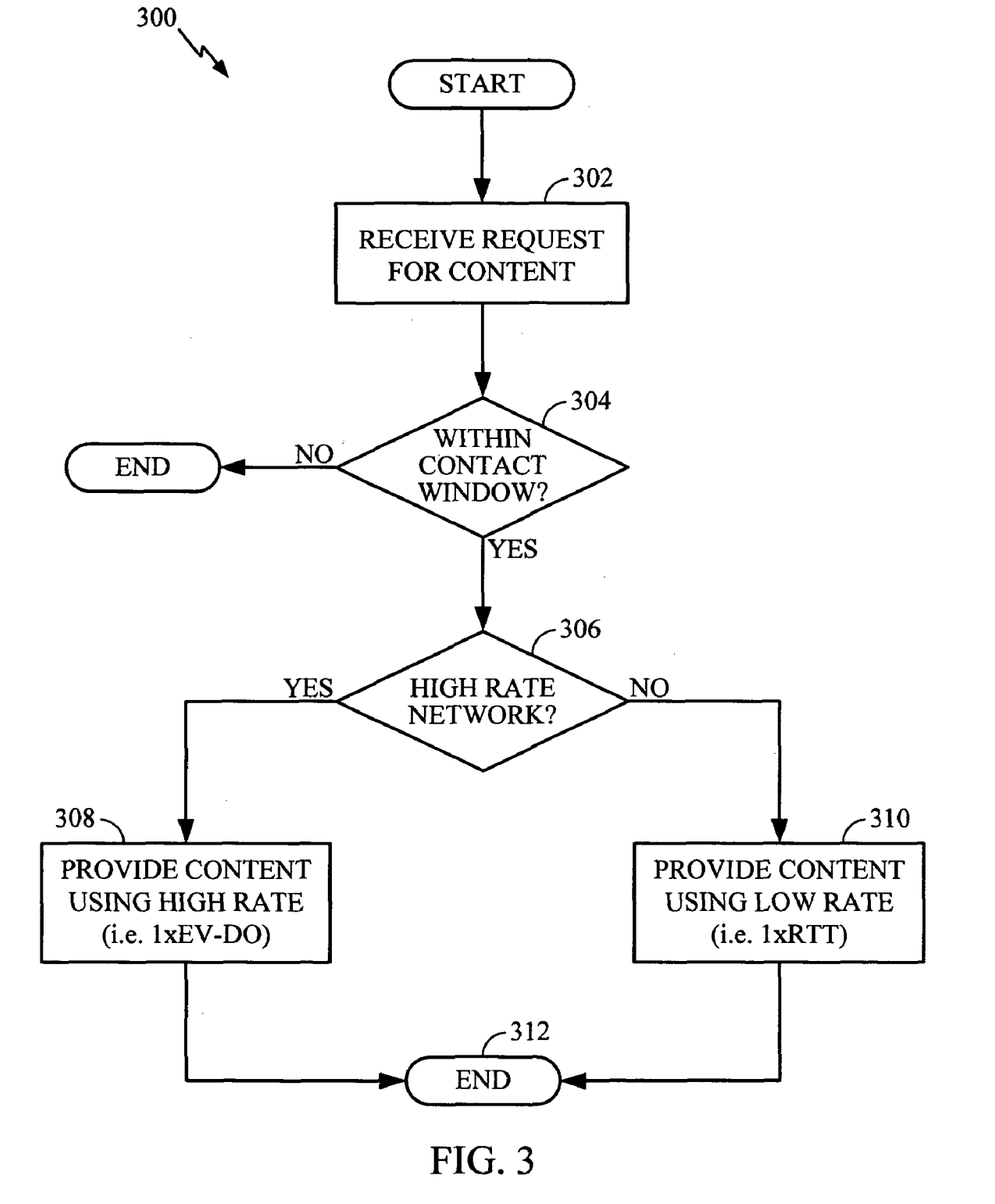
FIG. 3 shows one embodiment of a method for operating a server in one embodiment of a content delivery system.

FIG. 3 shows one embodiment of a method 300 for operating a server in one embodiment of a content delivery system. For clarity, the method 300 will be described with reference to the server 200 shown in FIG. 2, though other structural components or other means may be employed. In one or more embodiments, the processing logic 202 executes program instructions to perform the functions described below.

At block 302, the server receives a request for content. For example, in one embodiment, the server is coupled to a data network that is in communication with one or more terminals. At least one terminal on the network sends a request for content to the server. For example, in one embodiment, the request is received at the transceiver logic 208 and forwarded to the processing logic 202 for further processing.

At block 304, a test is performed to determine whether or not the request was received within a contact window specified for the requested content. For example, the contact window logic 206 operates to determine if the request is within a selected contact window. If the request is within the contact window, the method proceeds to block 306. If the request is not within the contact window, the method ends.

At block 306, a determination is made regarding the type of network connection available to the requesting device. For example, the server may be in contact with multiple data networks using different transmission technologies that are capable of supporting different data transmission rates. Any suitable technique may be used to discover the type of network connection available to the requesting device. For example, the device may indicate how it is connected in the request for content. Alternatively, the server may discover this information by communicating with the device or some other network entity. In one embodiment, the processing logic 202 operates to determine the type of network connection available to the requesting device. If the requesting device is connected to the network using a high data rate connection (i.e. CDMA2000 1× EV-DO), the method proceeds to block 308. If the requesting device is connected to the network using a lower data rate connection (i.e. CDMA2000 1×), the method proceeds to block 310.

It should be noted that while two types of network connections (and associated data rates) are described with reference to FIG. 3, the functions performed at block 306 might determine the type and/or capacity of any number of additional types of network connections. Thus, the system is suitable for use with virtually any number of network connections that may support various network transmission rates.

At block 308, the server provides the requested content over the high rate network. For example, the highest rate-encoded content can be provided to the requesting device because the network can support its transmission. For example, the processing logic 202 retrieves the requested content and transmits it to the device via the transceiver logic 208. The method then ends at block 312.

At block 310, the server provides the requested content over the low rate network. For example, the lower rate-encoded content can be provided to the requesting device because the low rate network can support its transmission. For example, the processing logic 202 retrieves the requested content and transmits it to the device via the transceiver logic 208. The method then ends at block 312.

It should be noted that the method 300 illustrates just one embodiment and that changes, additions, or rearrangements of the functional elements may be made without deviating from the scope of the described embodiments.

Figure 4:
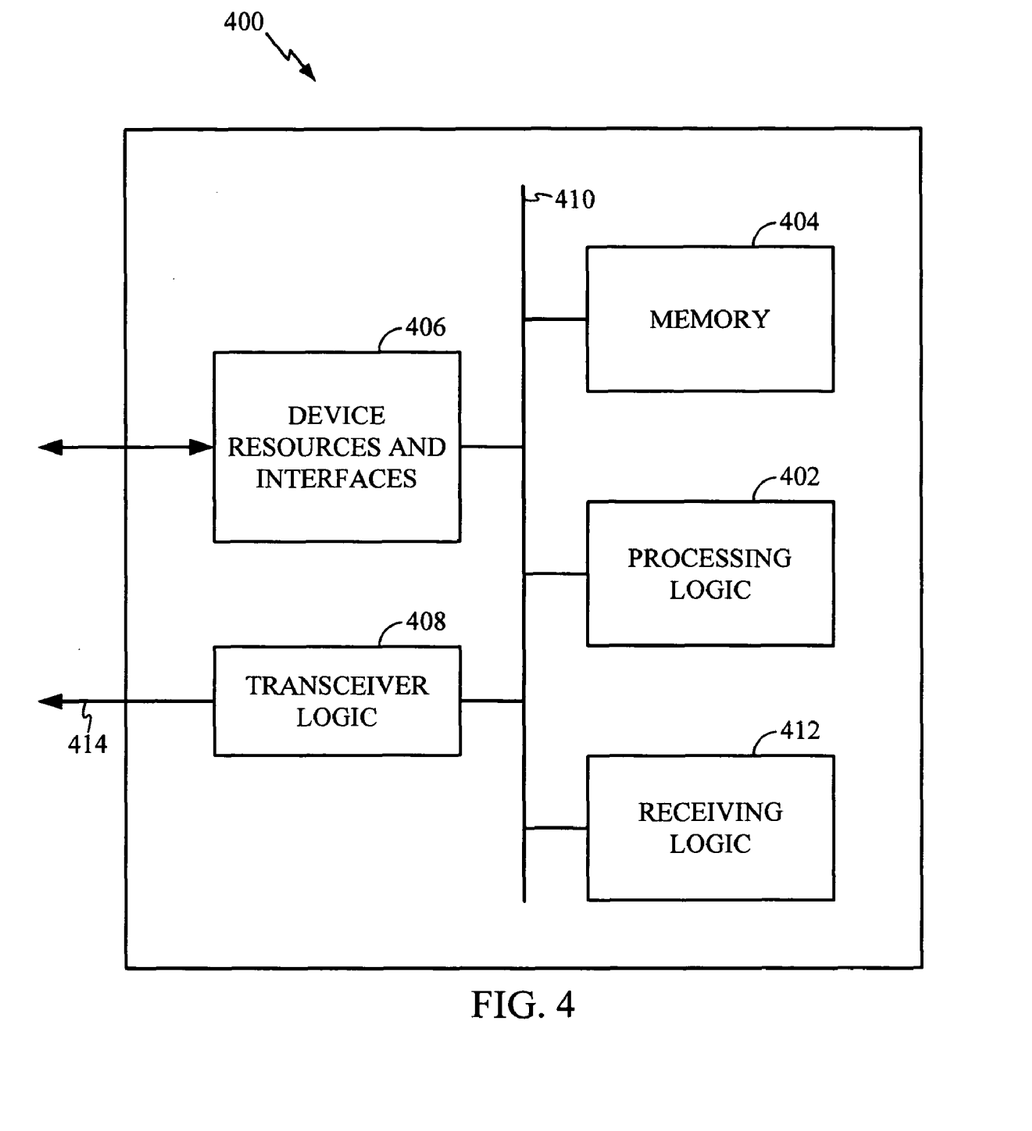
FIG. 4 shows a detailed diagram of one embodiment of a mobile device suitable for use in one embodiment of a content delivery system.

FIG. 4 shows a detailed diagram of one embodiment of a terminal 400 suitable for use in one embodiment of a content receiving system. The terminal 400 comprises processing logic 402, memory 404, device resources and interfaces 406, transceiver logic 408, all coupled to a data bus 410. The terminal 400 also comprises receiving logic 412, which is also coupled to the data bus 410.

In one or more embodiments, the processing logic 402 comprises a CPU, processor, gate array, hardware logic, memory elements, virtual machine, software, and/or any combination of hardware and software. Thus, the processing logic 402 generally comprises logic to execute machine-readable instructions, and to control one or more other functional elements of the terminal 400 via the internal data bus 410.

The device resources and interfaces 406 comprise hardware and/or software that allow the terminal 400 to communicate with internal and external systems. For example, internal systems may include mass storage systems, memory, display driver, modem, or other internal device resources. The external systems may include user interface devices, printers, disk drives, or other local devices or systems.

The transceiver logic 408 comprises hardware and/or software that operate to allow the terminal 400 to transmit and receive data and/or other information with external devices or systems via communication channel 414. For example, in one embodiment, the transceiver logic 408 comprises a forward channel, reverse channel, and a control channel that operates to allow the terminal 400 to communicate over a wireless communication network. The transceiver logic 408 is adjustable so that it may communicate with a wireless network using one or more transmission technologies. For example, the transceiver logic 408 may communicate with a network using a high data rate transmission technology (i.e., CDMA2000 1× EV-DO), or a lower data rate transmission technology (i.e., CDMA2000 1×). Thus, the transmission logic 408 operates to allow the terminal 400 to communication with data networks using a variety of transmission technologies.

The memory 404 comprises any type of memory suitable for storing information at the terminal 400. For example, the terminal 400 may operate to download content and store the received content in the memory 404 for further processing.

The receiving logic 412 comprises a CPU, processor, gate array, hardware logic, memory elements, virtual machine, software, and/or any combination of hardware and software. The receiving logic 412 operates to determine information about the network that is currently in communication with the terminal. During a hand-off, the receiving logic 412 determines information about the new network connection. This information is passed to the processing logic 202, which operates to automatically decide how content will be received over the new network connection.

In one embodiment, receiving parameters or configuration information is stored in the memory 404. For example, the parameters or configuration information is stored during device manufacture, or is downloaded to the device from an external system and stored in the memory 404. The parameters or configuration information identify how the terminal should operate to download content during changing network conditions. For example, if the terminal 400 is downloading content via a high speed connection (i.e., CDMA2000 1× EV-DO) the parameters indicate how the terminal 400 should obtain the content if the terminal is handed-off to a slower network (i.e., CDMA2000 1×). Thus, the processing logic 402 processes the parameters to determine how content should be obtained during changing network conditions.

In one embodiment, the parameters indicate cost criteria that allow the processing logic 402 to determine how to download content based on network and/or content costs. In another embodiment, the parameters indicate efficiency and/or network bandwidth parameters that allow the processing logic 402 to determine how to download content based on network efficiency or bandwidth requirements. In another embodiment, the parameters indicate content types that allow the processing logic 402 to determine how to download content based on the content type. Thus, the parameters and/or configuration information may provide any type of criteria that is used by the processing logic 402 to determine how to download content during changing network conditions. As a result, the content delivery system operates automatically to determine how to download content during changing network conditions without requesting input from the device user or requiring the device user to take any specific action.

In one embodiment, the content delivery system comprises program instructions stored on a computer-readable media, which when executed by the processing logic 402, provides the functions of the terminal 400 described herein. For example, instructions may be loaded into the terminal 400 from a computer-readable media, such as a floppy disk, CDROM, memory card, FLASH memory device, RAM, ROM, or any other type of memory device or computer-readable media that interfaces to the terminal 400 via the device resources 406. In another embodiment, the instructions may be downloaded into the terminal 400 from a network resource that interfaces to the terminal 400 via the transceiver logic 408. The instructions, when executed by the processing logic 402, provide one or more embodiments of a content delivery system as described herein.

Figure 5:
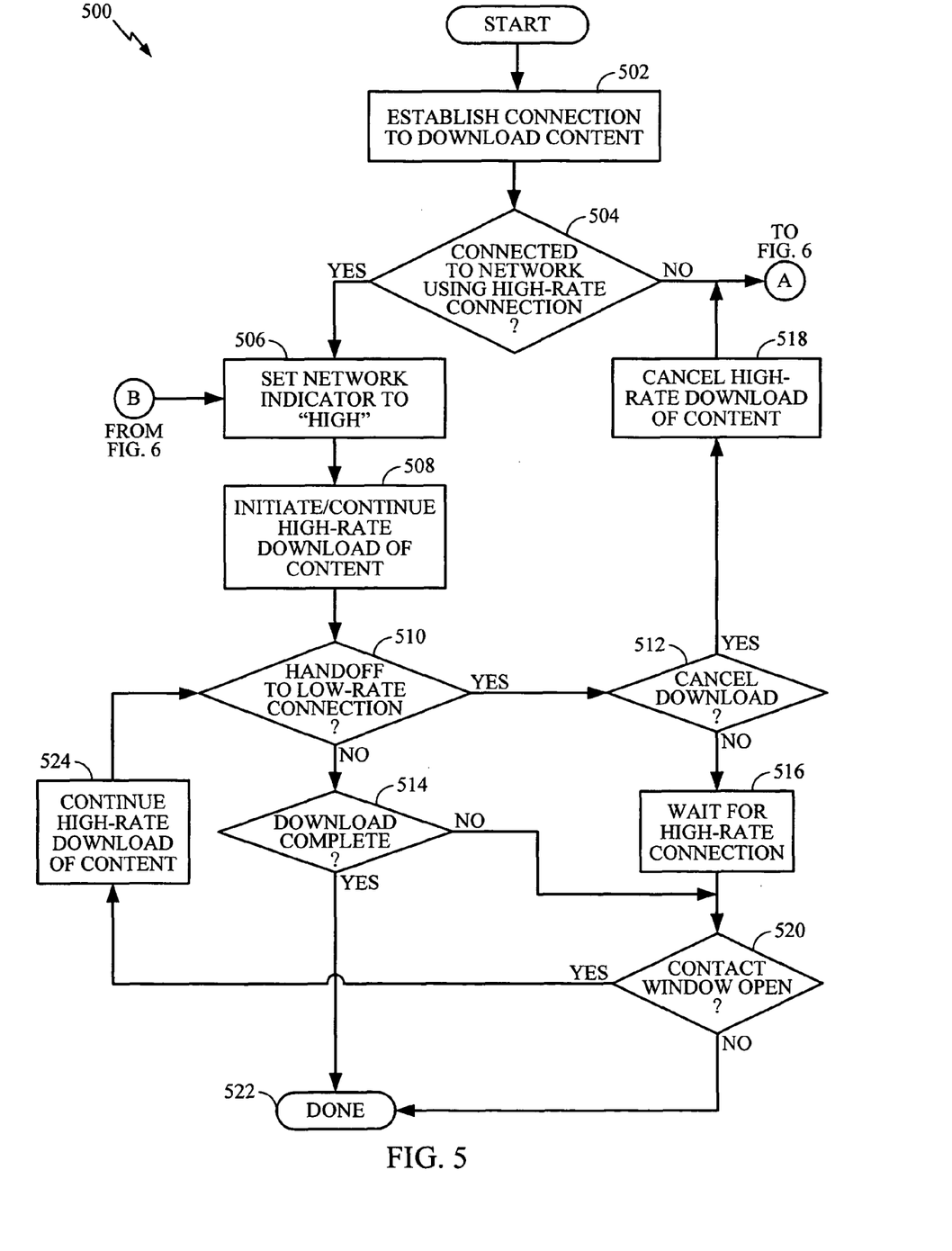
FIG. 5 shows a first portion of one embodiment of a method for operating a mobile device in one embodiment of a content delivery system.
Figure 6:
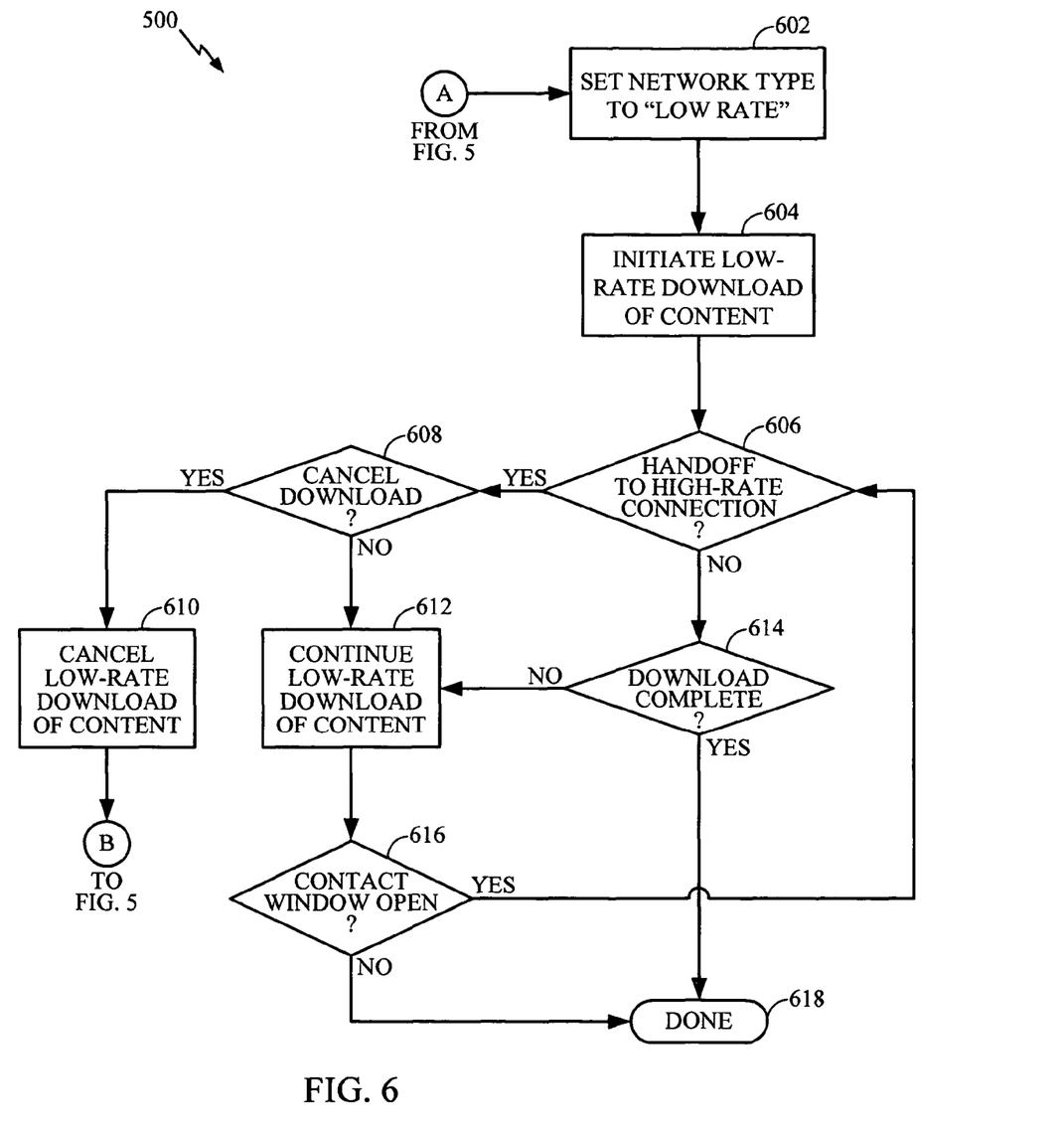
FIG. 6 shows a second portion of the method of FIG. 5 for operating a mobile device in one embodiment of a content delivery system.

FIG. 5 shows a first portion of one embodiment of a method 500 for operating a terminal in one embodiment of a content delivery system. A second portion of the method 500 is shown in FIG. 6. For clarity, the method 500 will be described with reference to the terminal 400 shown in FIG. 4. In one or more embodiments, the processing logic 402 executes program instructions to control the terminal 400 to perform the functions described below.

At block 502, the mobile terminal establishes a network connection with an available data network to download content. For example, in one embodiment, the processing logic 402 communicates with the data network via the transceiver logic 408 to establish a network connection that allows the terminal to download content over the network.

At block 504, a test is performed to determine the type of network connection and the data rates that the network connection can support. For example, the network may be a high-speed network that supports data transmission using CDMA2000 1× EV-DO. Alternatively, the network may be a low speed network that supports data transmission using CDMA2000 1×. If the network is a high-speed network, the method proceeds to block 506. If the network is a low-speed network, the method proceeds to point "A" in FIG. 6. In one embodiment, the receiving logic 412 determines the type of network connection based on the initialization of the network connection performed at block 502.

At block 506, the network connection has been determined to be a high-speed network connection, and so a network indicator is set to a value of "high." For example, the processing logic 402 operates to set an internal variable to indicate the type of network connection established by the terminal.

At block 508, the terminal initiates or continues a high data-rate download of content. For example, the processing logic 402 sends a request for content to a content server via the transceiver logic 408. In one embodiment, the processing logic 402 uses the internal variable to determining the type of network and request content encoded to provide a selected level of service based on the existing network connection. For example, the request requests content that has been encoded to provide a high level of service (i.e., high resolution when rendered).

At block 510, a test is performed to determine if the terminal has been handed off to a low speed network. For example, if the terminal has moved it geographic location it may be handed off to another network that operates to provide network services to that location. For example, the processing logic 402 operates to determine the types of network coverage available in a particular geographic region and facilitates the handoff to a new network if necessary. If a handoff to a low speed network connection has occurred, the method proceeds to block 512. If a handoff has not occurred, the method proceeds to block 514.

At block 512, a handoff to a low speed network connection has occurred and a test is performed to determine if the content download should be cancelled. For example, the processing logic 402 determines if the content download should be cancelled based on configuration information stored in the memory 404. For example, in one embodiment, the configuration information is stored into the terminal during manufacture process. If the current content download is to be canceled, the method proceeds to block 518. If the download is to continue, the method proceeds to block 516.

At block 518, the current download is canceled. For example, the terminal transmits a message to the content server to cancel the current content download. The method then proceeds to point "A" in FIG. 6 where a request for content encoded for low speed transmission is sent to the server. For example, a handoff to a low speed network has occurred and the terminal has canceled the high-speed download and will proceed to request a low speed download of the same content over the new network connection. In one embodiment, the processing logic 402 sends the request to the content server via the transceiver logic 408.

At block 514, a test is performed to determine if the content download is complete. For example, the content has been downloaded to the terminal and stored in the memory 404. If the download is complete, the method ends at block 522. If the download is not complete, the method proceeds to block 520.

At block 516, the terminal waits to establish a high data-rate connection to continue downloading the content as before. For example, the content download has not completed before the handoff to the low data-rate connection has occurred. The terminal waits to establish a high data rate connection to continue to download the content. For example, the terminal may have only briefly left the high-speed network and will be handed back to the high-speed network after only a short interval. Thus, once a connection to a high-speed network has been restored, the content download can continue. For example, the processing logic 402 operates to wait for a hand-off or other event that restores the high data-rate connection. In another embodiment, the original high data-rate network connection is not restored, but another connection that supports data rates higher than the low data-rate connection is established. Thus, the new connection is faster than the low data-rate connection and may be used to download the content with a selected quality level.

At block 520, a test is performed to determine if the contact window is still available so that the content may be downloaded from the server. If the contact window is still open, the method proceeds to block 524 to continue downloading the content. If the contact window is not open, the method ends at block 522.

At block 524, the content download continues using the high data-rate connection. The method then proceeds to block 510 where a test for a hand-off condition occurs.

It should be noted that the method 500 illustrates just one embodiment and that changes, additions, combinations, or rearrangements of the functional elements may be made without deviating from the scope of the described embodiments. For example, the blocks 516 and 520 may be combined so that testing of the contact window may be performed while waiting for a high-speed network connection to return. Furthermore, a second portion of the method 500 is described with reference to FIG. 6. The second portion of the method 500 describes how the content delivery system operates to download content in the event of a handoff to a low data-rate network.

FIG. 6 shows a second portion of the method 500 for operating a mobile device in one embodiment of a content receiving system. For clarity, the second portion of the method 500 will be described with reference to the terminal 400 shown in FIG. 4. In one or more embodiments, the processing logic 402 executes program instructions to perform the functions described below.

At block 602, the network connection to the terminal has been determined to be a low data-rate network connection, and so a network indicator is set to a value of "low." For example, the processing logic 402 operates to set an internal variable to indicate the type of network connection that the terminal has connected to.

At block 604, the terminal initiates a content download using the low data-rate connection. For example, the processing logic 402 sends a request for content to a content server via the transceiver logic 408. In one embodiment, the processing logic 402 uses the internal variable to determining the type of network connection available and requests content encoded for transmission at the appropriate rate. For example, the request requests content encoded at a low data rate.

At block 606, a test is performed to determine if the terminal has been handed off to a high-speed network connection. For example, if the terminal has moved its geographic location, it may be handed off to another network that operates to provide network services to that location. For example, the receiving logic 412 operates to determine the types of network coverage available in a particular geographic region and facilitates the handoff to a new network if necessary. If a handoff to a high-speed network connection has occurred, the method proceeds to block 608. If a handoff has not occurred, the method proceeds to block 614.

At block 608, a handoff to a high-speed network has occurred and a test is performed to determine if the low-speed content download should be canceled. For example, the processing logic 402 determines if the content download should be cancelled based on configuration information stored in the memory 404. For example, in one embodiment, the configuration information is stored into the memory 404 during manufacture process. If the current low-speed content download is to be canceled, the method proceeds to block 610. If the download is to continue, the method proceeds to block 612.

At block 610, the content download is canceled. For example, a hand-off to a high-speed network has occurred and the terminal has canceled the low-speed download. In one embodiment, the processing logic 402 sends the request to cancel the content download to the content server via the transceiver logic 408. The method then proceeds to point "B" shown in FIG. 5, which describes how a request for a high quality content download is processed.

At block 614, a test is performed to determine if the low-speed content download is complete. For example, the test determines if the low-speed content has been completely downloaded to the terminal and stored in the memory 404. If the download is complete, the method ends at block 618. If the download is not complete, the method proceeds to block 612.

At block 612, the terminal attempts to continue downloading the low-speed content via a low-speed network. For example, if no handoff has occurred and the content download has not completed, the terminal continues the content download using the low rate network connection. For example, the processing logic 402 continues to receive and store content in the memory 404.

However, if a handoff to a high-speed network has occurred, and the terminal has not canceled the download, the terminal continues to download the content using the low rate over the new high-speed network. For example, the terminal may download the content at low-speed even if it has been handed off to a high-speed network connection.

At block 616, a test is performed to determine if a contact window is still available so that the content may be downloaded from the server. If the contact window is still open, the method proceeds to block 606 to test for a new handoff condition. If the contact window is not open, the method ends at block 618.

It should be noted that the second portion of the method 500 illustrates just one embodiment and that changes, additions, or rearrangements of the functional elements may be made without deviating from the scope of the described embodiments.

Figure 7:
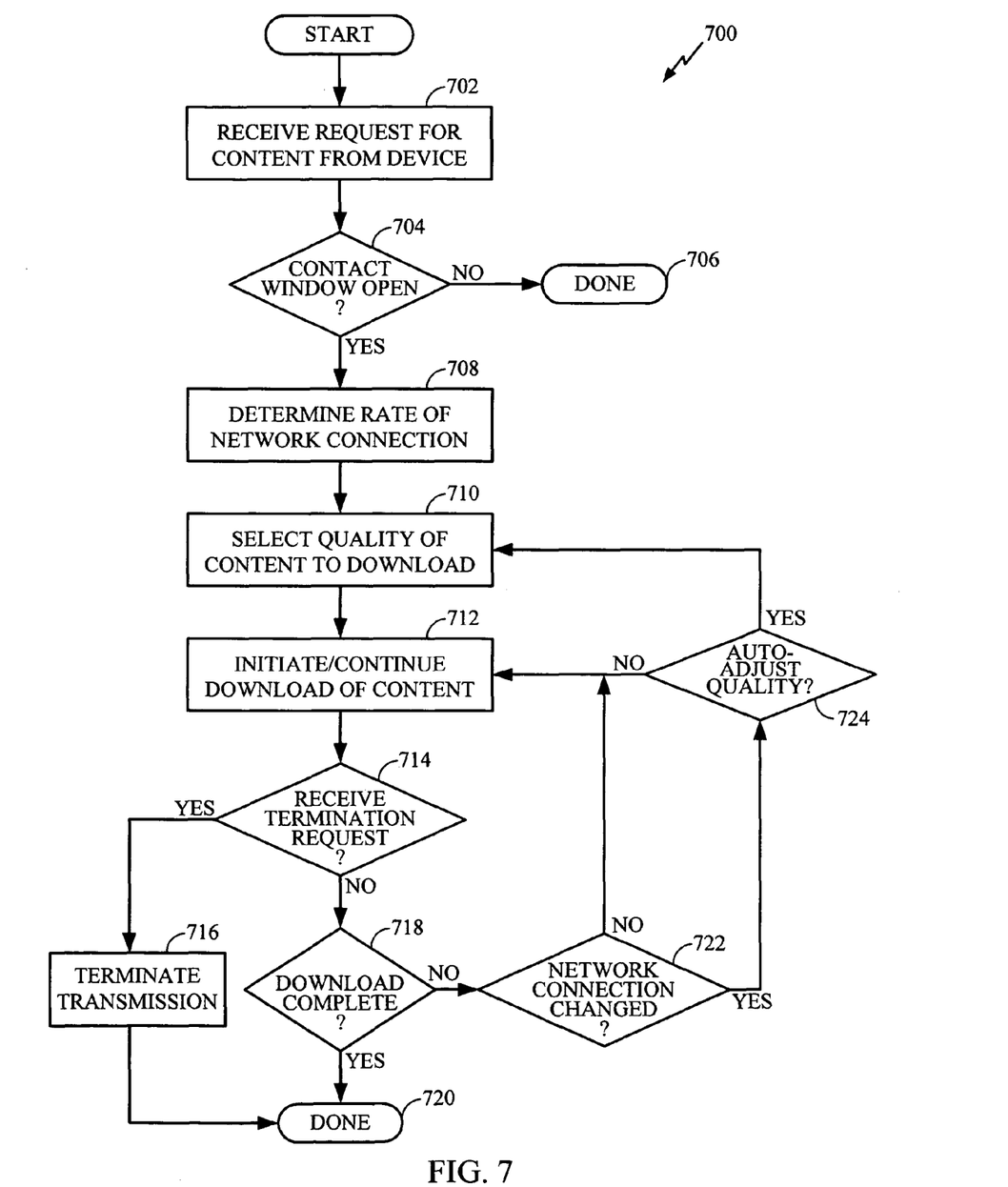
FIG. 7 shows one embodiment of a method for operating a server in one embodiment of a content delivery system.

FIG. 7 shows one embodiment of a method 700 for operating a server in one embodiment of a content delivery system. For clarity, the method 700 will be described with reference to the server 200 shown in FIG. 2. In one or more embodiments, the processing logic 202 executes program instructions to perform the functions described below.

At block 702, a request for content is received at the server. For example, the request is received from a requesting device in communication with a wireless network. For example, in one embodiment, the request is received by the transceiver logic 208.

At block 704, a test is performed to determine if a contact window is still open for the requested content. For example, in one embodiment, the contact window logic 206 operates to determine if the requested content is available for download. If the contact window is not open, the method ends at block 706. If the contact window is open, the method proceeds to block 708.

At block 708, a determination is made to determine the transmission capacity of the network connection of the requesting device. For example, in one embodiment, information about the network connection of the requesting device is included in the request for content. In another embodiment, the processing logic 202 discovers the information about the network connection of the requesting device by communicating with other network entities. For example, the processing logic 202 discovers the transmission rate associated with the network connection of the requesting device.

At block 710, content having a selected quality level is selected for transmission to the requesting device. For example, the processing logic 202 operates to select encoded content from the content 210 for delivery to the device. In one embodiment, the quality level of the content is selected based on the network connection associated with the requesting device. For example, if the device is connected to the network using a high data-rate connection (i.e., CDMA2000 1× EV-DO), the highest quality level will be selected for delivery to the device. If the device is connected to the network using a low data-rate connection (i.e., CDMA2000 1×), lower quality content is selected for delivery to the device.

At block 712, the server initiates a transmission of the selected content to the requesting device. For example, the processing logic 202 controls the transceiver logic 208 to delivery the selected content to the device using the network connection associated with the device.

At block 714, a test is performed to determine if a termination request has been received from the device. For example, the device may send a request to terminate the content transmission if the device has been handed off to a different type of network connection. In one embodiment, the processing logic 202 processes a received termination request to terminate the content transmission. If a termination request has been received, the method proceeds to block 716. If a termination request has not been received, the method proceeds to block 718.

At block 716, the server terminates the transmission of content to the requesting device. For example, in one embodiment, the processing logic 202 operates to terminate the content transmission. The method then ends at block 720.

At block 718, a test is performed to determine if the content transmission is complete. For example, in one embodiment, the processing logic 202 operates to determine if the transmission of content has completed. If the content transmission is completed, the method then ends at block 720. If the transmission of content has not completed, the method proceeds to block 722.

At block 722, a test is performed to determine if the network connection associated with the remote device has changed. For example, if the remote device has undergone a network handoff, the network connection used by the device may be faster or slower than the previous connection. The processing logic 202 operates to discover the current network connection associates with the remote device. If the network connection has not changed, the method proceeds to block 712 where the delivery of content continues. If the network connection of the remote device has changed, the method proceeds to block 724.

At block 724, a test is performed to determine if the server should automatically adjust the quality of content delivered to the device based on the new network connection associated with the device. For example, if the device has undergone a handoff to a faster or slower network connection, the server may automatically adjust the quality of content delivered to the device, so that the new network connection is most efficiently utilized. In one embodiment, parameters associated with the device are used to determine if the quality level of the content should be automatically adjusted. For example, the device may have subscribed with the server to receive "premium services." In this case, the server will attempt to provide the highest quality content to the device under all or most circumstances. In one embodiment, the server decides whether or not to automatically adjust the quality level of the content based on network parameters. For example, the server attempts to meet a selected network efficiency level so that the network is not over-burdened trying to transmit high data-rate content over low data-rate connections. Thus, the processing logic 202 operates to process any type of parameter or indicator associated with the device, the content, or the network connection to determine if the quality level of the content should be automatically adjusted.

If the quality level of the content is to be automatically adjusted, the method proceeds to block 710, where the quality level of the content is selected, and the delivery of the content occurs at block 712. Note that the content continues to be delivered to the device without interruption, but with a new quality level. For example, depending on the data-rate associated with the new network connection, the quality level of the content may be increased or decreased. For example, higher or lower resolution content may be provided.

If the quality level of the content is not to be automatically adjusted based on the new network connection, the method proceeds to block 712, where the content continues to be delivered to the device at the same quality level. For example, if the device is receiving low quality content over a low data-rate network connection, and the device is handed off to a high data-rate connection, the device will continue to receive the low quality content over the high data-rate connection. Thus, the content delivery system operates to allow content of various quality levels to be provided to a device as the device is handed off between network connections that support different data rates.

It should be noted that the method 700 illustrates just one embodiment and that changes, additions, or rearrangements of the functional elements may be made without deviating from the scope of the described embodiments.

Accordingly, while one or more embodiments of a content delivery system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope insistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

We claim:

1. A method for transmitting content, the method comprising:
   encoding content at multiple rates to create a plurality of rate encoded copies;
   establishing a wireless connection with a device using a first network of a first type having a first data rate capability;
   selecting a rate encoded copy of the content to transmit to the device based on the first data rate capability;
   initiating transmitting the selected rate encoded copy to a device via the first network;
   pausing the transmitting of the selected rate encoded copy if the connection is handed to a second network of a second type having a second data rate capability lower than the first data rate capability;
   determining if a contact window is open;
   determining if the connection is handed to a third network having a data rate capability at least equal to the first data rate; and
   continuing to transmit the selected rate encoded copy via the third network if it is determined that the contact window is open and the third network has a data rate capability at least equal to the first data rate capability.

2. The method of claim 1, wherein the first network comprises a 1×EV-DO network and the second network comprises a 1×RTT network.

3. An apparatus for transmitting content in a wireless data network, the apparatus comprising:
   means for encoding content at multiple rates to create a plurality of rate encoded copies;
   means for establishing a wireless connection with a device using a first network of a first type having a first data rate capability;
   means for selecting a rate encoded copy of the content to transmit to die device based on the first data rate capability;
   means for initiating transmitting the selected rate encoded copy to a device via the first network;
   means for pausing the transmitting of the selected rate encoded copy if the wireless connection is handed to a second network of a second type having a second data rate capability lower than the first data rate capability;
   means for determining if a contact window is open; and
   means for determining if the connection is handed to a third network having a data rate capability at least equal to the first data rate; and
   means for continuing to transmit the selected rate encoded copy via the third network if it is determined that the contact window is open and the third network has a data rate capability at least equal to the first data rate capability.

4. The apparatus of claim 3, wherein the first network comprises a 1×EV-DO network and the second network comprises a 1×RTT network.

5. An apparatus for transmitting content in a wireless data network, the apparatus comprising:
   a memory;
   a processor coupled to said memory, wherein the processor is configured with processor-executable instructions to perform steps comprising:
      encoding content at multiple rates to create a plurality of rate encoded copies;
      establishing a wireless connection with a device using a first network of a first type having a first data rate capability;
      selecting a rate encoded copy of the content to transmit to the device based on the first data rate capability;
      initiating transmitting the selected rate encoded copy to a device via the first network;
      determining if the connection is handed to a second network of a second typo having a second data rate capability lower than the first data rate capability;
      pausing the transmitting of fire selected rate encoded copy if the wireless connection is handed to a second network of a second type having a second data rate capability lower than the first data rate capability;
      determining if a contact window is open; and
      determining if the connection is handed to a third network having a data rate capability at least equal to the first data rate; and
      continuing to transmit the selected rate encoded copy via the third network if it is determined that the contact window is open and the third network has a data rate capability at least equal to the first data rate capability.

6. The apparatus of claim 5, wherein the first network comprises a 1×EV-DO network and the second network comprises a 1×RTT network.

7. A computer program product, comprising:
a non-transitory computer-readable storage media comprising:
at least one instruction for encoding content at multiple rates to create a plurality of rate encoded copies;
at least one instruction for establishing a wireless connection with a device using a first network of a first type having a first data rate capability;
at least one instruction for selecting a rate encoded copy of the content to transmit to the device based on the first data rate capability;
at least one instruction for initiating transmitting the selected rate encoded copy to a device via the first network;
at least one instruction for determining if the connection is handed to a second network of a second type having a second data rate capability lower than the first data rate capability;
at least one instruction for pausing the transmitting of the selected rate encoded copy if the wireless connection is handed to a second network of a second type having a second data rate capability lower than the first data rate capability;
at least one instruction for determining if a contact window is open; and
at least one instruction for determining if the connection is handed to a third network having a data rate capability at least equal to the first data rate; and
at least one instruction for continuing to transmit the selected rate encoded copy via the third network if it is determined that the contact window is open and the third network has a data rate capability at least equal to the first data rate capability.

8. The computer program product of claim 7, wherein the first network comprises a 1×EV-DO network and the second network comprises a 1×RTT network.

* * * * *